No. 675,370. Patented June 4, 1901.
I. M. BETHEL.
STUMP PULLER.
(Application filed Jan. 28, 1901.)
(No Model.)
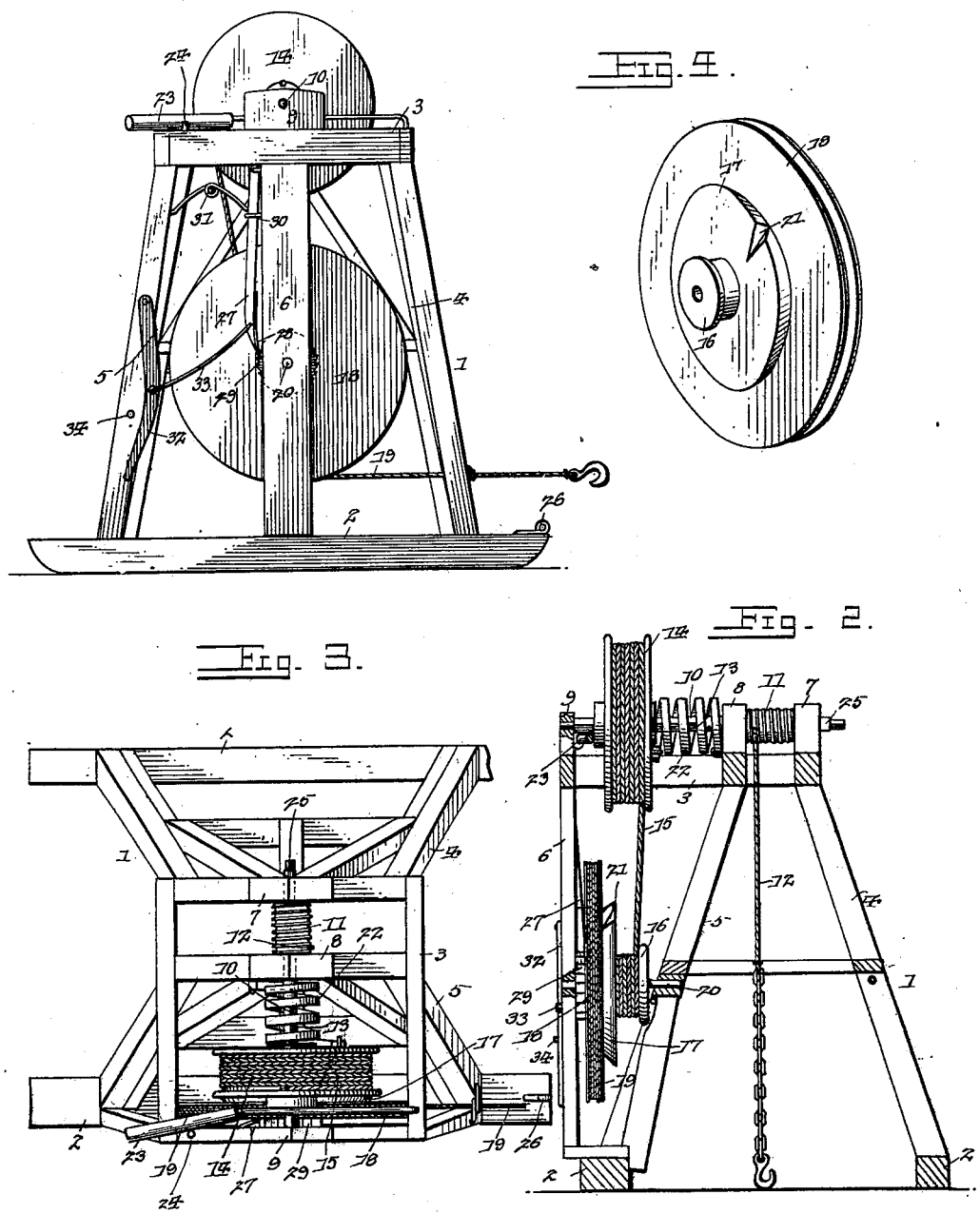

UNITED STATES PATENT OFFICE.

ION MAYWOOD BETHEL, OF MASON, TEXAS, ASSIGNOR OF THREE-FOURTHS TO N. Z. BETHEL, OF SAME PLACE, AND VICTOR HOMER BETHEL AND SIBLY FLOYD BETHEL, OF LONDON, TEXAS.

STUMP-PULLER.

SPECIFICATION forming part of Letters Patent No. 675,370, dated June 4, 1901.

Application filed January 28, 1901. Serial No. 45,035. (No model.)

*To all whom it may concern:*

Be it known that I, ION MAYWOOD BETHEL, a citizen of the United States, residing at Mason, in the county of Mason and State of Texas, have invented a new and useful Stump-Puller, of which the following is a specification.

The invention relates to improvements in stump-pullers.

One object of the present invention is to improve the construction of stump-pullers and to provide a simple, inexpensive, and efficient one which will possess great strength and durability and which may be readily operated with a minimum amount of power.

A further object of the invention is to provide a stump-puller of this character adapted to be readily moved from one stump to another and to be placed over a stump without digging a place for it or staking it and capable of adjustment to vary the leverage to suit large and small stumps.

Another object of the invention is to provide means for enabling a cable or similar flexible connection to be automatically rewound after it has been unwound by a horse or other draft-animal in pulling a stump, and thereby obviate the necessity of backing such animal.

The invention consists in the construction and novel combination and arrangement of parts hereinafter fully described, illustrated in the accompanying drawings, and pointed out in the claims hereto appended.

In the drawings, Figure 1 is a side elevation of a stump-extractor constructed in accordance with this invention. Fig. 2 is a vertical sectional view of the same. Fig. 3 is a plan view. Fig. 4 is a detail view of the lower pulleys.

Like numerals of reference designate corresponding parts in all the figures of the drawings.

1 designates a main or supporting frame mounted on runners 2 to enable the stump-puller to be readily moved from one stump to another, and the said frame, which may be constructed in any suitable manner, is preferably provided with a rectangular top portion 3, which is supported by inwardly-inclined portions 4 and 5 and an approximately vertical portion 6. The upright portions of the frame are composed of suitable posts and connecting-braces, and the top of the frame is provided with suitable bearing-boxes 7, 8, and 9 for the reception of a horizontal shaft 10. The horizontal shaft 10 is preferably provided with an enlargement 11, having a spiral groove for the reception of a wire or other cable 12, which is connected with the said shaft at its inner end and which is provided at its outer end with suitable means for engaging a stump. Any suitable means—such as a chain and hook, grapples, and the like—may be provided for this purpose, and when the horizontal shaft is rotated in the proper direction by the means hereinafter described the cable 12 will be wound up on the grooved portion of the horizontal shaft to pull a stump out of the ground. The inwardly-inclined portions 4 and 5 of the supporting-frame are connected with the top of the frame at the ends of the grooved portion of the horizontal shaft, and it will be apparent that a structure of great strength is provided at a point where the frame is subjected to the greatest strain.

The horizontal shaft 10 is provided with a squared portion 13, receiving a sliding pulley 14 and located over the space between the upright portions 5 and 6 of the frame, and the said sliding pulley, which is operated by the means hereinafter described, is provided with a peripheral groove and has wound upon it a portion of an intermediate cable 15, constructed of wire or other suitable material. The intermediate cable 15 extends downward from the upper pulley 14 and is adapted to be wound around a small pulley 16 or a larger pulley 17 to vary the leverage or power of the stump-puller to adapt it for operating on large or small stumps. The small pulley 16 is secured to the larger pulley 17, which is located between the said pulley 16 and a much larger pulley 18, which is provided with a peripheral groove for the reception of a cable 19, designed to be attached to a horse or other draft-animal. The pulleys 16, 17, and 18 are mounted upon a suitable shaft 20, and the cable 19 is provided at its outer end with a hook adapted to be connected to a singletree to enable a horse to be hitched to the stump-puller. The intermediate pulley 17, which preferably consists of a beveled disk, is suitably secured to the inner face of the large pulley 18 and is provided with a notch 21, for a purpose hereinafter described. The small pulley, which is also beveled, as shown, is suitably secured to the intermediate pulley. The intermediate cable is attached to the small pulley 16, and the upper sliding pulley is adapted to be arranged above the small pulley 16, as illustrated in Fig. 2 of the accompanying drawings, to cause the intermediate cable to be wound around the said small pulley, or the said upper sliding pulley may be moved outward to carry the intermediate cable into engagement with the intermediate pulley for winding it thereon. When the upper pulley is moved outward toward the upright portion 6 of the frame, the intermediate cable is carried to the intermediate pulley and is engaged by the notch or recess thereof, whereby the said intermediate cable is wound upon the intermediate pulley. When the intermediate cable is wound up on the small pulley 16, the leverage of the stump-puller will be much greater than when the intermediate pulley 17 is used, and the stump-puller will then be adapted for operating on large stumps. When the intermediate pulley 17 is used, the machine will have less power, but will operate more quickly.

The stump-puller is operated by hitching a horse to the cable 19 and unwinding the latter from the large lower pulley 18. This operation unwinds the intermediate cable from the upper sliding pulley and rotates the shaft 20 to wind up the cable 12, which is connected with the stump to be extracted. After the stump has been extracted the horse is unhitched from the cable 19, and the latter is wound up by means of a coiled spring 22, preferably of spiral form, arranged on the central portion of the horizontal shaft and secured to the frame and to the sliding pulley 14; but the spring may be connected with the shaft, if desired. By connecting the spring to the upper pulley it is also adapted to throw the latter outward for holding the intermediate cable in position for winding it upon the intermediate pulley. The sliding pulley is operated by a shifting lever 23, fulcrumed on the frame at the front thereof and provided with a rear handle portion and having a metal shank or rod arranged to engage a metallic hub of the sliding pulley. The frame is provided with a stop 24, and the lever has a limited upward movement or spring to enable it to be readily placed at the inner or outer side of the projection or stop 24. When the lever is at the inner side of the stop or projection, as illustrated in Fig. 3 of the accompanying drawings, the sliding pulley will be held in the position also shown in Fig. 2 to cause the intermediate cable to be wound upon the small pulley, and when the lever is moved to the outer side of the stop or projection the coiled spring will throw the sliding pulley outward to engage the intermediate cable with the notch 21 of the intermediate pulley. The shifting lever may be connected with the hub of the sliding pulley in any suitable manner, and, if desired, the coiled spring may be omitted, as the shaft is provided with a squared extension 25 to enable it to receive a crank-handle for winding up the cables. A stump-extractor may also be constructed without the intermediate pulley 17, and the upper pulley will then be fixed to the upper horizontal shaft.

The stump-extractor is provided at the front ends of the runners with eyes 26 to enable a horse after it has been detached from the cable 19 to be hitched to the frame for drawing the stump-extractor from one portion of a field to another to enable it to be readily placed over a stump. The runners form a broad base for the stump-extractor, and it is unnecessary to dig a place for it around a stump or to stake it to the ground. The spring is prevented from jerking the cable 19 backward should the said cable become slackened by means of a spring-actuated pawl or dog 27, hinged at its upper end to the frame, near the top thereof at one side of the same, and provided at its lower end with a tooth 28, which engages a ratchet-wheel 29, mounted on the outer face of the large pulley 18 and carried by the same. The pawl or dog, which is supported and held against lateral movement by a guide 30, is engaged by one end of a spring 31, secured at the other end to the frame and provided with an intermediate coil. When it is desired to release the ratchet-wheel to enable the spring to wind up the cable 19, the pawl or dog is swung backward by means of an operating-lever 32, pivoted at its upper end to the frame and connected between its ends with the pawl or dog by a rod 33 and adapted to be engaged with a stop 34 to hold the pawl or dog away from the ratchet-wheel. When the lever 32 is disengaged from the stop 34, the spring 31 will return the pawl or dog to the position illustrated in Fig. 1 of the drawings.

It will be seen that the stump-puller is simple and comparatively inexpensive in construction, that it is easily operated, and that it will enable great power to be applied for pulling a stump out of the ground. It will also be apparent that comparatively little cable is required, that it is not dangerous to operate, and that the cable of the pulleys will be rewound on them by the coiled spring. Also it will be clear that the spring is prevented by the pawl and ratchet from jerking backward on the flexible connection 19 and annoying the horse or other draft-animal should the said flexible connections become slackened, and that the leverage may be varied to adapt the stump-puller for operating on large and small stumps. The stump-puller is also capable of being rapidly operated, and it may be quickly placed in position over another stump after one stump has been extracted, and it will reduce to a minimum the necessity of chopping and digging around the stumps to be extracted. Also when the upper pulley 14 is moved outward toward the end of the shaft the cable 15 is carried against the intermediate pulley and is automatically engaged by the notch thereof, the engaging wall of the notch being sufficiently undercut to enable it to positively catch and hold the cable.

What I claim is—

1. A stump-puller comprising a frame, the upper shaft, the flexible connection 12 arranged to be wound on the upper shaft and designed to be connected with a stump, an upper pulley slidingly mounted on the upper shaft, a coiled spring disposed on the upper shaft and adapted to rotate the same and connected with the upper pulley and adapted to permit the same to slide, the lower pulleys of different diameters, an intermediate cable connected with one of the lower pulleys and adapted to be shifted by the upper pulley, and a cable connected with the lower pulleys and adapted to operate the stump-puller, substantially as described.

2. A stump-puller comprising a frame, a horizontal shaft, a sliding pulley mounted on the said shaft, pulleys 16 and 17, the pulley 17 being provided with a notch, a cable connected with the pulley 16 and with the sliding pulley and arranged to be engaged with the said notch to wind it on the pulley 17, and means for rotating the pulleys 16 and 17, substantially as described.

3. A stump-puller comprising a frame, a shaft, a sliding pulley mounted on the shaft, the pulleys 16 and 17 of different diameters, a cable connected with the sliding pulley and with the pulley 16 and arranged to be carried by the said sliding pulley to the pulley 17, the pulley 18 connected with the pulleys 16 and 17 and provided with a cable, and means for connecting a stump with the shaft, substantially as described.

4. A stump-puller comprising a frame, a shaft, a sliding pulley mounted on the shaft, the pulleys 16 and 17, an intermediate cable connected with the sliding pulley and with the pulley 16 and adapted to be carried by the sliding pulley to the pulley 17, means for rotating the pulleys 16 and 17, a coiled spring connected with the sliding pulley and adapted to rewind the cable on the same and capable of sliding the pulley in one direction, operating mechanism for moving the sliding pulley in the opposite direction, and means for connecting a stump with the shaft, substantially as described.

5. A stump-puller comprising a frame, a horizontal shaft, a sliding pulley mounted on the shaft, the pulleys 16, 17 and 18 connected together, an intermediate cable connected with the sliding pulley and with the pulley 16 and adapted to be carried to the pulley 17 by the said sliding pulley, a cable 19 wound around the pulley 18 and designed to be connected with a draft-animal, a spring for rotating the shaft, and a pawl and ratchet for holding the pulley 18 against the backward movement, substantially as described.

In testimony that I claim the foregoing as my own I have hereto affixed my signature in the presence of two witnesses.

ION MAYWOOD BETHEL.

Witnesses:
L. E. BETHEL,
N. Z. BETHEL.